United States Patent
Sewell

(10) Patent No.: US 7,661,537 B1
(45) Date of Patent: Feb. 16, 2010

(54) MULTI-FINGER CLAMSHELL DISC

(76) Inventor: Rodney H. Sewell, PMB 107 17602 17th St., Suite #102, Tustin, CA (US) 92780

( * ) Notice: Subject to any disclaimer, the term of this patent is extended or adjusted under 35 U.S.C. 154(b) by 213 days.

(21) Appl. No.: 11/977,453

(22) Filed: Oct. 25, 2007

Related U.S. Application Data

(60) Provisional application No. 60/858,659, filed on Nov. 14, 2006.

(51) Int. Cl.
*B07B 13/00* (2006.01)
(52) U.S. Cl. .................. 209/671; 209/668; 209/669
(58) Field of Classification Search ............... 209/672, 209/671, 668, 669
See application file for complete search history.

(56) References Cited

U.S. PATENT DOCUMENTS

| | | | | |
|---|---|---|---|---|
| 4,466,862 A | * | 8/1984 | Ring et al. ............... 162/55 |
| 4,795,036 A | * | 1/1989 | Williams ................. 209/667 |
| 4,901,864 A | * | 2/1990 | Daugherty ............... 209/672 |
| 5,450,966 A | * | 9/1995 | Clark et al. .............. 209/672 |
| 5,799,801 A | | 9/1998 | Clark et al. |
| 6,076,684 A | | 6/2000 | Bollegraaf |
| 6,149,018 A | * | 11/2000 | Austin et al. ............. 209/672 |
| 6,318,560 B2 | | 11/2001 | Davis |
| 6,986,425 B2 | * | 1/2006 | Paladin .................... 209/671 |
| 7,004,332 B2 | | 2/2006 | Davis |
| 7,261,209 B2 | * | 8/2007 | Duncan et al. ............ 209/672 |
| 7,434,695 B2 | * | 10/2008 | Visscher et al. .......... 209/643 |
| 2007/0099553 A1 | * | 5/2007 | Blaha et al. ............... 453/61 |

* cited by examiner

*Primary Examiner*—Patrick Mackey
*Assistant Examiner*—Michael Butler
(74) *Attorney, Agent, or Firm*—Gordon K. Anderson

(57) ABSTRACT

A multi-fingered clamshell disc is taught that is used with an apparatus for classifying a stream of mixed recyclable materials. The disc includes a body with outwardly extending fingers, a centrally located square opening, a tapered notch and a tapered slot, with the notch and slot on opposite sides of the square opening. Insert sets are molded within the body adjacent to the notch and the slot configured to receive socket head cap screws that compress the notch and slot thereby tightly gripping the shaft of the apparatus. The disc is installed by spreading open the body in clamshell manner then slipping the body over the shaft allowing it to spring back in shape then attaching with the cap screws. A spacer is installed on one side or both sides of the body for separating the disc from other discs.

15 Claims, 4 Drawing Sheets

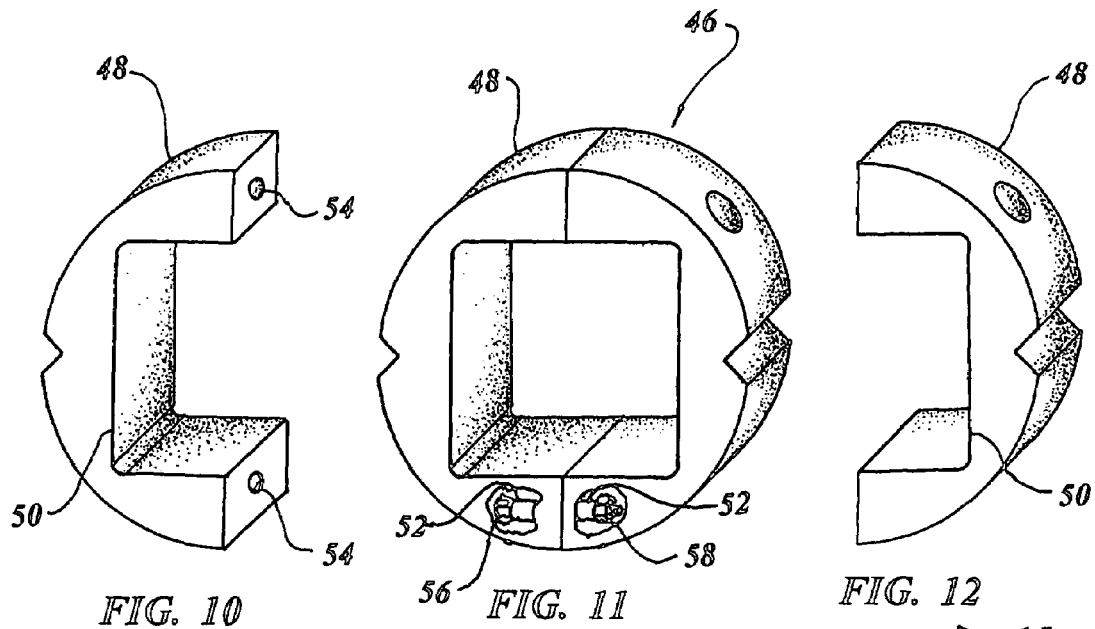
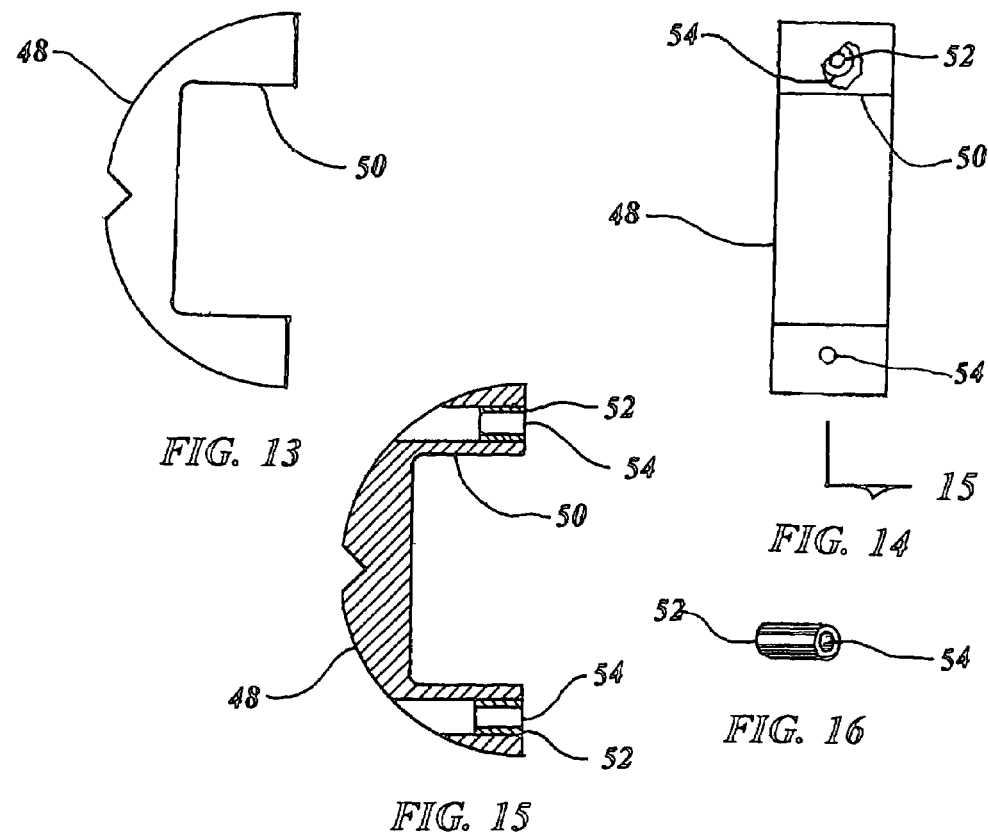

MULTI-FINGER CLAMSHELL DISC

CROSS REFERENCE TO RELATED APPLICATION

This application claims priority of Provisional Patent Application Ser. No. 60/858,659 filed Nov. 14, 2006.

TECHNICAL FIELD

The present invention relates to discs for processing recycling material in general. More specifically to a clamshell disc made in one-piece that spreads open to allow attachment to a shaft without disassembly of the disc screen apparatus.

BACKGROUND OF THE INVENTION

Previously, many types and styles of discs have been used in endeavoring to provide an effective means to sort materials classified by size in a rotating screen.

The prior art listed below did not disclose patents that possess any of the novelty of the instant invention; however the following U.S. patents are considered related:

| U.S. Pat. No. | Inventor | Issue Date |
| --- | --- | --- |
| 4,795,036 | Williams | Jan. 3, 1989 |
| 5,450,966 | Clark et al. | Sep. 19, 1995 |
| 5,799,801 | Clark et al. | Sep. 1, 1998 |
| 6,076,684 | Bollegraaf | Jun. 20, 2000 |
| 6,149,018 | Austin et al. | Nov. 21, 2000 |
| 6,318,560 B2 | Davis | Nov. 30, 2001 |
| 7,004,332 B2 | Davis | Feb. 28, 2006 |

Clark et al. in U.S. Pat. No. 5,450,966 teach a disc screen for classifying material by size which consists of a frame with a plurality of shafts mounted parallel with a first stage having discs in a coplanar row. Each disc has a perimeter shaped to maintain the space therebetween during rotation. A second stage includes discs shaped to maintain the space constant.

U.S. Pat. No. 5,799,801 issued to Clark et al. teach a disc screen for classifying material by size which includes shafts mounted on a frame with discs mounted in a row. Each disc is shaped to maintain a space between other discs during rotation. Debris materials are dropped from a roll over section so that the debris either falls vertically or flips over promoting separation. A discharge section agitates the debris while moving up an incline until the larger debris discharges at the rear end.

Bollegraaf in U.S. Pat. No. 6,076,684 discloses a waste paper sorting conveyor having a bed formed by a row of rotatable shafts carrying mutually spaced impellers. The impellers have contours spaced between mating shafts.

Austin et al. in U.S. Pat. No. 6,149,018 teaches a compound disc to eliminate a secondary slot normally formed between adjacent shafts of a material separation screen. The disc includes a primary disc joined to an associated secondary disc. The primary disc and secondary disc are formed of rubber and have the same shape but the secondary disc has a smaller outside perimeter and is wider. The discs are interleaved with oppositely aligned adjacent shafts.

U.S. Pat. No. 6,318,560 B2 issued to Davis is for a disc screen apparatus for separating mixed recyclable materials of varying sizes and shapes. The screen has an enclosure with an input location, a discharge location and a sorted paper location. A first plurality of shafts and second plurality of shafts are located on the frame with one or more motors rotating the shafts. Each shaft includes discs substantially square in shape with radiused corners having a texture, such as ridges. Each disc is assembled about each a shaft from two identical portions which are clamped together about the shaft to form the disc. If the disc is damaged or worn it may be removed from the shaft without disassembly of the shaft from the apparatus or the removal of other discs. The discs are also disclosed as comprising an inner rived frame supporting an outer softer material. This patent of Davis is the basis of the instant invention improvement of a new and novel disc for use with the same or similar apparatus.

Davis in U.S. Pat. No. 7,004,332 B2 discloses an apparatus for classifying a stream of mixed recyclable materials of varying sizes and shapes having an inclined fixed first disc screen section and an articulating section angled section. The angle can be adjusted with a hydraulic cylinder. The frames have complementary mating surfaces that limit the range of articulation of the second disc screen section.

For background purposes and as indicative of the art to which the invention is related reference may be made to the remaining cited patent issued to Williams in U.S. Pat. No. 4,795,036.

BRIEF SUMMARY OF THE INVENTION

The apparatus protected by U.S. Pat. No. 6,318,560 B2 of Davis for a disc screen device for separating mixed recyclable materials of varying sizes and shapes has been in use for some time and is successfully employed in various locations throughout this country. This apparatus utilizes screen with an enclosure having an input location, a discharge location and a sorted paper location. There are a number of first shafts and second shafts located on the frame with one or more motors rotating the shafts. Each shaft includes discs square in shape with radiused corners with each disc assembled around the shaft using two identical halves that are clamped together. The apparatus is designed so that a single disc may be removed from the shaft without disassembly of the shaft from the apparatus or the removal of other discs; however the procedure for removal and assembly requires at least two separate workers and preferably three to accomplish the task.

The reason that so many workers are required is that one must be above the disc and another below in order to handle each half as it is impossible to reach around the structure with only one person. The third worker preferably removes as well as installs and tightens the cap screws as they are also located on opposite sides of the disc.

It is therefore the primary object of the invention to eliminate the costly manual labor by utilizing a disc that can be easily removed or installed by a single worker. With the improvements of the instant invention the worker removes the old worn out or damaged disc from the existing apparatus and manually spreads wide open the body of the replacement disc like a clamshell, then slips the opened body easily over the shaft allowing the body to spring back into its original shape. When this is accomplished the worker inserts a socket head cap screw into each inserts and tightens with wrench. One can easily see that the improvement of using the clamshell approach is new and novel and solves an existing problem that has been apparent since the apparatus has been in use.

An important object of the invention is in its flexibility since the discs of the existing apparatus have an integral spacer molded into the sides of each half. The improvement of the instant invention utilizes a separate spacer made of a pair of spacer bodies placed over the shaft nesting against one or both sides of the disc. As and example if the improved disc were placed between two old discs a spacer of the same width as the old discs may be used on each side, however if two improved discs were placed side by side only a single spacer of double the width would be required in between. Furthermore the most significant improvement would permit the gap to between discs to be changed by simply using a different width spacer. It is anticipated that spacers having a thickness varying in inch increments of from 1.00 inch to 5.00 inches would be available. The spacer bodies are simply bolted together with conventional cap screws and nuts with the nut manually pressed into the aperture formed above the sleeve permitting the cap screw to thread into the nut from the opposite side.

Another object of the invention it that the improved disc weighs less, as it is made with outwardly extending fingers instead of being substantially square in shape with radiused corners having a ridged texture on the corners.

Still another object of the invention it that it has been found that the improved disc lasts longer in service since the fingers flex and do not simply grind down with use as is the present case.

Yet another object is that the material used in the instant invention has not only a high coefficient of friction but is also combined with good abrasion characteristics.

These and other objects and advantages of the present invention will become apparent from the subsequent detailed description of the preferred embodiment and the appended claims taken in conjunction with the accompanying drawings.

BRIEF DESCRIPTION OF THE SEVERAL VIEWS OF THE DRAWING

FIG. 10 is a left side partial isometric view of one of the disc spacers used with the multi-fingered clamshell disk.

FIG. 11 is a partial isometric view of an attached together disc spacer, including the attaching cap screws and nuts, used with the multi-fingered clamshell disk.

FIG. 12 is a right side partial isometric view of one of the disc spacers used with the multi-fingered clamshell disk.

FIG. 13 is a left side elevation view of one of the disc spacers used with the multi-fingered clamshell disk.

FIG. 14 is a bottom elevation view of one of the disc spacers used with the multi-fingered clamshell disk.

FIG. 15 is a cross sectional view taken along lines 15-15 of FIG. 14.

FIG. 16 is a partial isometric view of one of the sleeves molded into each disc spacer.

DETAILED DESCRIPTION OF THE INVENTION

Figure 1:
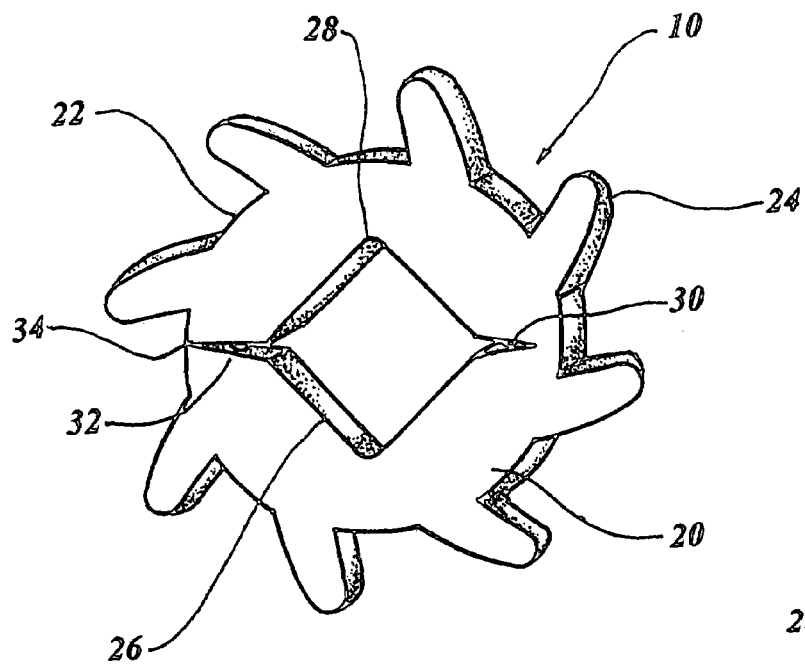
FIG. 1 is a partial isometric view of the multi-fingered clamshell disk in the preferred embodiment.
Figure 2:
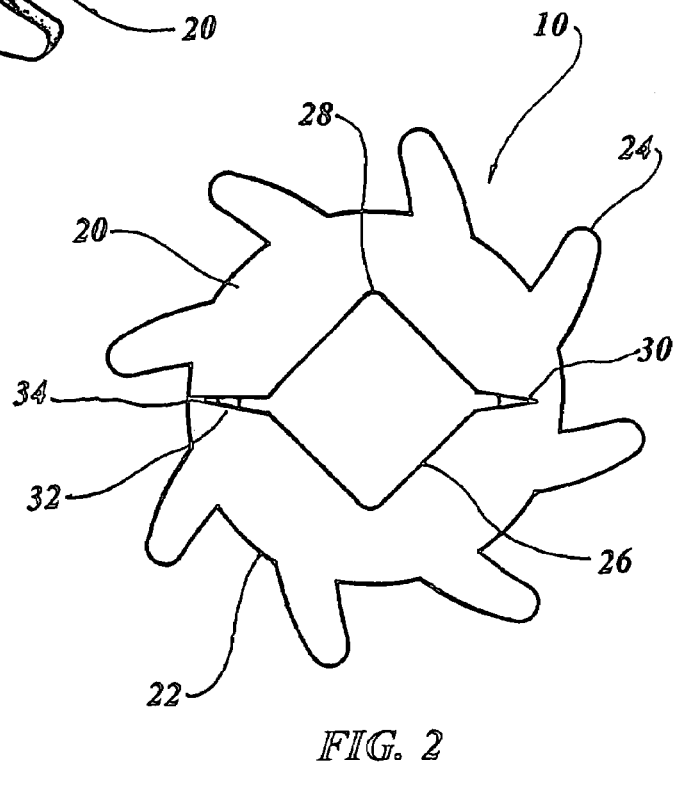
FIG. 2 is a front side elevation view of the multi-fingered clamshell disk in the preferred embodiment.
Figure 3:
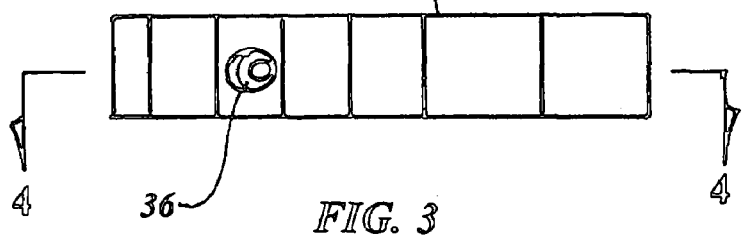
FIG. 3 is a bottom elevation view of the multi-fingered clamshell disk in the preferred embodiment.

The best mode for carrying out the invention is presented in terms of a preferred embodiment of the multi-fingered clamshell disc 10 for use with an apparatus for classifying a stream of mixed recyclable materials of varying sizes and shapes. This preferred embodiment is shown in FIGS. 1 through 16 and is comprised of a resilient disc body 20 configured in a thin flat circular shape, as illustrated best in FIGS. 1-4. The body 20 includes a radial perimeter 22 and preferably eight integrally formed fingers 24. The body 20 is fabricated from polyurethane 80 shore A material and in its preferred embodiment has an overall outside diameter over the fingers 24 of from 12.50 inches to 13.50 inches with a thickness of at least 2.00 inches and the radial perimeter 22 diameter of at least 9.00 inches.

The plurality of fingers 24 are integrally formed as an appendage to the radial perimeter 22 with the fingers 24 extending outwardly in a evenly spaced manner. The fingers 24 each have a radial end of at least one inch in diameter, are angled from 55 degrees to 65 degrees and tapered at the radial perimeter 22 interface wider than the redial end. Other basic sizes and number of fingers may be used for a variety of classifying apparatus and still fall within the scope of the invention.

The body 20 incorporates a centrally positioned square opening 26, depicted in FIGS. 1, 2, 4 and 9 that continues therethrough, with radial corners 28, sized to fit a shaft of the existing apparatus onto which the disc 10 is attached. The square opening 26 preferably has a size of at least 4.00 inches square with radial corners of 0.25 inch.

The body 20 includes a tapered notch 30 therein with a proximal end interfacing with the radial corners 28 of the square opening 26 and a distal end tapering adjacent to the radial perimeter 22 with the tapered notch 30 having no more than 15 degrees of taper. A tapered slot 32 is incorporated with a proximal end interfacing with corners 28 of the square opening 26 and a distal end tapering to a slit 34 intersecting with the radial perimeter 22 with one side of the taper parallel with a horizontal centerline of the disc 10. The slot 32 is arranged in linear alignment with the notch 30, as illustrated best in FIG. 4. The tapered slot 32 preferably has no more than 10 degrees of taper and one side of the taper is parallel with a horizontal centerline of the disc 10.

Figure 4:
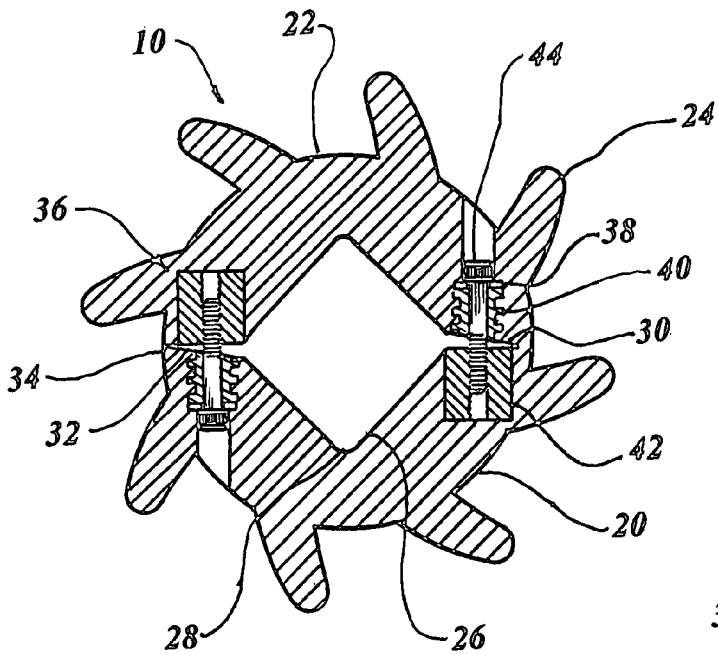
FIG. 4 is a cross sectional view taken along lines 4-4 of FIG. 3 illustrating the insert sets formed within the disc.
Figure 5:
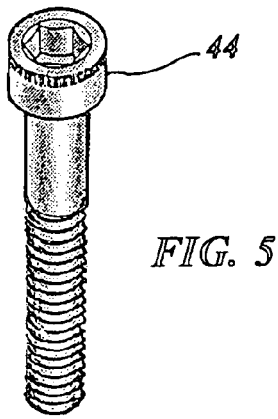
FIG. 5 is a partial isometric view of one of the socket head cap screws of the insert sets in the preferred embodiment.

Preferably two insert sets 36 are molded within the body 20 with one positioned adjacent to the notch 30 and the other adjacent to the slot 32. The insert sets 36 are configured to receive threaded fasteners for compressing the notch 30 and slot 32 to tightly grip the shaft of the apparatus after the body 20 has been spread open closed over the apparatus shaft. The insert sets 36 are duplicated in the separate two sets with one set interfacing with the notch 30 and the other set interfacing with the slot 32 in reverse order, as illustrated in FIG. 4.

The insert sets 36 each are made up of four separate elements consisting of a supporting ring 38, a support column, 40 a threaded block 42, all formed within the disc body 20, with a socket head cap screw 44 attaching the insert set 36 together.

Figure 6:
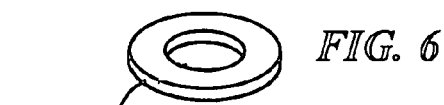
FIG. 6 is a partial isometric view of one of the metallic flat supporting rings insert sets in the preferred embodiment.
Figure 7:
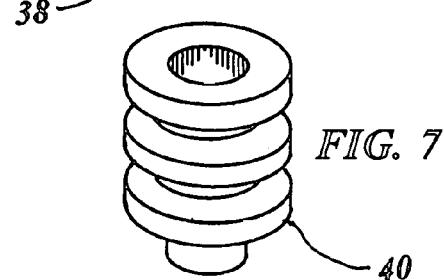
FIG. 7 is a partial isometric view of one of the support columns of the insert sets in the preferred embodiment.
Figure 8:
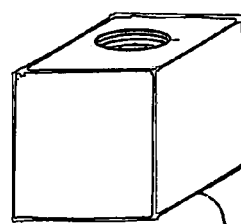
FIG. 8 is a partial isometric view of one of the threaded blocks of the insert sets in the preferred embodiment.
Figure 9:
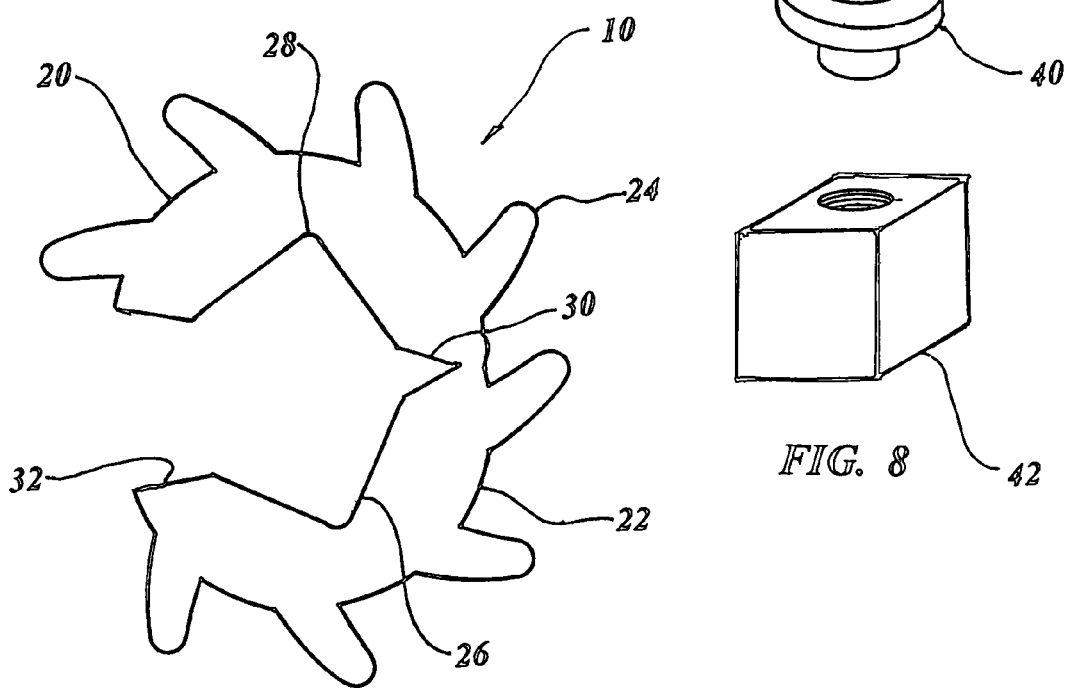
FIG. 9 is a front side elevation view of the multi-fingered clamshell disk spread open as if it were to be fastened over a shaft of an apparatus for classifying a stream of mixed recyclable materials of varying sizes and shapes.

The supporting ring 38 is preferably flat having a metallic construction with a thickness of from 0.01 inches to 0.015 inches and an inside diameter of at least 0.70 inches, as illustrated in FIG. 6. The support column 40 is fabricated of polyurethane 80 shore D material, which is rigid as opposed to the resilient material of the body 20, and is shown in FIG. 7. The aluminum threaded block 42 is depicted in FIG. 8, and a socket head cap screw 44 is inserted through the flat supporting ring 38, support column 40 and threaded into the aluminum threaded block 42, as illustrated in FIG. 4.

In order to install the disc 10 the body 20 is manually spread open in clamshell manner and then slipped over the shaft allowing the body 20 to spring back in shape with the socket head cap screws 44 installed to complete the installation.

A spacer 46, shown in FIGS. 10-16, is employed along with the disc 10 that is used to separate the disc body 20 from other discs mounted on the apparatus. The spacer 46 is mated on one or both sides of the body 20 and consists of a mating pair of resilient semi-circular spacer bodies 48 each having a rectangular opening 50. The pair are sized to fit over one half of the shaft of the apparatus, as shown in FIG. 11. The combined pair that make up the spacer 46 that has a diameter of at least 6.25 inches and a thickness varying in inch increments of from 1.00 inch to 5.00 inches with the width selected according to the application. The rectangular openings 50, when the mated pair of spacer bodies contiguously engage each other, form a combined opening of at least 4.00 inches square.

Each spacer body 48 has two metallic tubular insert sleeves 52 that are molded within. Each sleeve 52 incorporates an aligned bore 54 therethrough, such that when the spacer bodies 48 are joined together a threaded fastener, in the form of a cap screw 58 may be inserted through each insert sleeve 52 attaching the bodies 48 together around the shaft of the apparatus with a nut 54, as illustrated in the cutaway of FIG. 11. The spacer 46 is formed of polyurethane elastomer 80 shore A material which is the same as the disc body 20.

To install the disc 10 and spacer 46 a single worker removes the old worn out or damaged disc from the existing apparatus and manually spreads open the body 20 like a clamshell and then slips it over the shaft allowing the body 20 to spring back in shape. When this is accomplished the socket head cap screws 44 are the placed into the inserts 36 and tightened. A pair of spacer bodies 48 are placed over the shaft nesting against one or both sides of the disc body 20 and the spacer bodies are bolted together with conventional cap screws 56 and nuts 58 to complete the installation.

Figure 17:
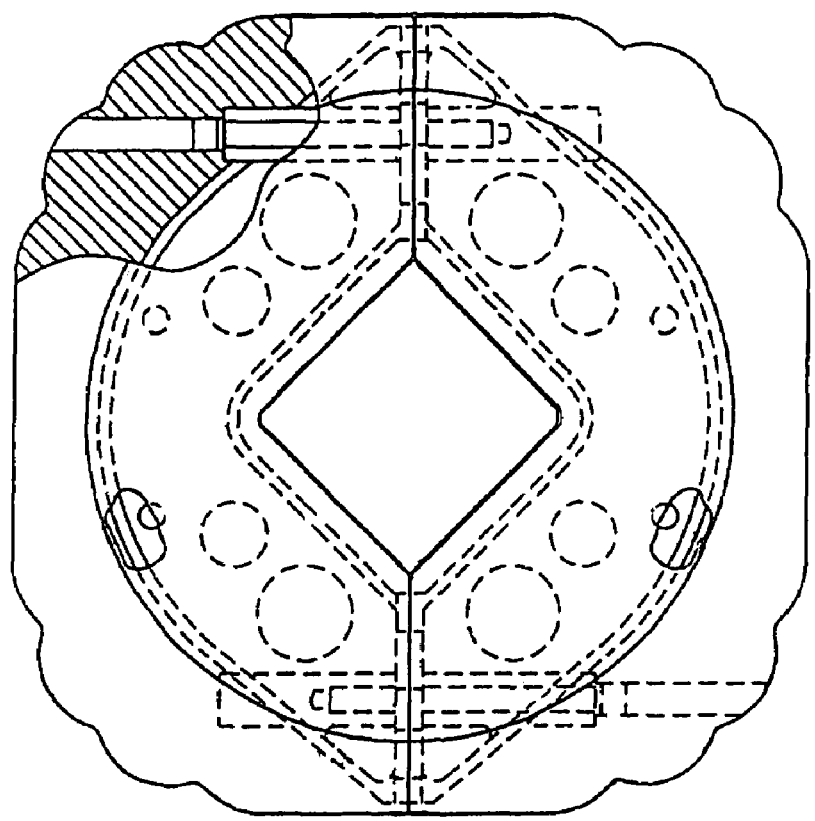
FIG. 17 is a side elevation view of a PRIOR ART disc, with a portion cut away, showing certain elements with hidden lines, with the disc utilized in an existing apparatus for classifying a stream of mixed recyclable materials as taught in U.S. Pat. No. 6,318,560 B2 issued to Davis.
Figure 18:
FIG. 18 is an edge elevation view of a PRIOR ART disc that is utilized in an existing prior art apparatus for classifying a stream of mixed recyclable materials as taught in U.S. Pat. No. 6,318,560 B2 issued to Davis.

FIGS. 16 and 17 illustrate a prior art disc now utilized in the existing apparatus for classifying a stream of mixed recyclable materials as protected by U.S. Pat. No. 6,318,560 B2 issued to Davis. It will be noted that the prior art disc is assembled around the shaft using two identical portions clamped together to form the disc with spacers integrally formed on both sides of the disk half, which are provided to position the discs apart.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A multi-finger clamshell disc for use with an apparatus for classifying a stream of mixed recyclable materials of varying sizes and shapes which comprises:
   a resilient disc body configured in a thin flat circular shape defining a radial perimeter,
   a plurality of fingers integrally formed as an appendage to said radial perimeter, the fingers extending outwardly from the radial perimeter in a evenly spaced manner,
   said body having a centrally positioned square opening therethrough, with radial corners, said square opening sized to fit onto a shaft of said apparatus,
   said body having a tapered notch therein with a proximal end interfacing with said radial corners of said square opening and a distal end tapering adjacent to said radial perimeter, wherein said tapered notch having no more than 15 degrees of taper,
   said body having a tapered slot therethrough with a proximal end interfacing with corners of said square opening and a distal end tapering to a slit intersecting with said radial perimeter and the slot arranged in linear alignment with said notch, and
   a plurality of insert sets molded within said body adjacent to said notch and said slot with the insert sets configured to receive threaded fasteners for compressing said notch and said slot together thereby tightly gripping the shaft of said apparatus after the body has been spread open, in clamshell manner, over the shaft and springs back in shape.

2. The multi-finger clamshell disc as recited in claim 1 further comprising, a spacer intimately embracing at least one side of said disc body for separating the disc body from other discs when mounted on the apparatus.

3. The multi-finger clamshell disc as recited in claim 2 wherein said spacer further comprising a mating pair of resilient semi-circular spacer bodies each having a rectangular opening therein each of the pair sized to fit over one half of the shaft of said apparatus.

4. The multi-finger clamshell disc as recited in claim 3 wherein said spacer further having a diameter of at least 6.25 inches, a thickness varying in inch increments of from 1.00 inch to 5.00 inches, when the mated pair of spacer bodies contiguously engage each other the rectangular openings form an opening of at least 4.00 inches square and said spacer formed of polyurethane elastomer 80 shore A material.

5. The multi-finger clamshell disc as recited in claim 3 wherein each of the mating pair of spacer bodies further having two metallic tubular insert sleeves molded therein, each sleeve having an aligned bore therethrough, such that when the spacer bodies are juxtapositioned together a threaded fastener, in the form of a cap screw, may be inserted through each insert sleeve attaching the bodies together around the shaft of said apparatus with a nut.

6. The multi-finger clamshell disc as recited in claim 1 wherein said resilient disc body further comprises eight integrally formed fingers with the body fabricated from polyurethane 80 shore A material.

7. The multi-finger clamshell disc as recited in claim 1 wherein said resilient disc body further having an overall outside diameter over the fingers of from 12.50 inches to 13.50 inches and a thickness of at least 2.00 inches.

8. The multi-finger clamshell disc as recited in claim 1 wherein said body radial perimeter having a diameter of at least 9.00 inches.

9. The multi-finger clamshell disc as recited in claim 1 wherein said fingers each have a radial end at least one inch in diameter and are angled from 55 degrees to 65 degrees and tapered at the radial perimeter interface wider than the redial end.

10. The multi-finger clamshell disc as recited in claim 1 wherein said centrally positioned square opening having a size at least 4.00 inches square with the radial corners having a 0.25 inch radius.

11. The multi-finger clamshell disc as recited in claim 1 wherein said tapered slot having no more than 10 degrees of taper and one side of the taper parallel with a horizontal centerline of the disc.

12. The multi-finger clamshell disc as recited in claim 1 wherein said plurality of insert sets further comprises a plurality of flat supporting rings having a metallic construction with a thickness of from 0.01 inches to 0.015 inches and an inside diameter of at least 0.70 inches.

13. The multi-finger clamshell disc as recited in claim 12 wherein said plurality of insert sets further comprises a plurality of support columns fabricated of polyurethane 80 shore D material interfacing with the flat supporting ring and jointly formed within the disc body.

14. The multi-finger clamshell disc as recited in claim 13 wherein said plurality of insert sets further comprises a plurality of aluminum threaded blocks formed within the disc body opposite the support columns.

15. The multi-finger clamshell disc as recited in claim 14 wherein said plurality of insert sets further comprises a plurality of socket head cap screws inserted through the flat supporting ring, support columns and threaded into the aluminum threaded blocks for tightly gripping the shaft of said apparatus after the disc body has been spread open in clamshell manner over the shaft springs back in shape.

\* \* \* \* \*